(12) United States Patent
Lin et al.

(10) Patent No.: US 8,330,880 B2
(45) Date of Patent: Dec. 11, 2012

(54) REFLECTIVE TYPE TOUCH-SENSING DISPLAY PANEL AND MANUFACTURING METHOD THEREOF

(75) Inventors: Hsiang-Lin Lin, Changhua County (TW); An-Thung Cho, Hualien County (TW); Chih-Jen Hu, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 255 days.

(21) Appl. No.: 12/781,805

(22) Filed: May 17, 2010

(65) Prior Publication Data

US 2011/0216256 A1 Sep. 8, 2011

(30) Foreign Application Priority Data

Mar. 4, 2010 (TW) .............................. 99106297 A (51) Int. Cl.
*G02F 1/1335* (2006.01)
(52) U.S. Cl. ........................................................ 349/12
(58) Field of Classification Search .................... 349/12
See application file for complete search history.

(56) References Cited

U.S. PATENT DOCUMENTS

| | | | |
|---|---|---|---|
| 2008/0314652 A1 | 12/2008 | Kim et al. | |
| 2009/0009675 A1* | 1/2009 | Cho et al. | 349/43 |
| 2009/0278121 A1* | 11/2009 | Kakkad et al. | 257/43 |

OTHER PUBLICATIONS

"First Office Action of China Counterpart Application", issued on Apr. 26, 2011, p. 1-p. 5, in which the listed reference was cited.

* cited by examiner

*Primary Examiner* — James Dudek
(74) *Attorney, Agent, or Firm* — Jianq Chyun IP Office (57) ABSTRACT

A reflective type touch-sensing display panel including a front substrate, scan lines, data lines, pixel structures, photo-sensors, readout devices, a rear substrate and a reflective display medium is provided. The front substrate has an inner surface. The scan lines and the data lines are on the inner surface of the front substrate and intersected to each other. The pixel structures are disposed on the inner surface of the front substrate, and each pixel structure is electrically connected to one of the scan lines and one of the data lines correspondingly. The photo-sensors are disposed on the inner surface of the front substrate. Each readout device is electrically connected to one of the photo-sensor correspondingly. The rear substrate is disposed opposite to the front substrate. The reflective display medium is sealed between the front substrate and the rear substrate.

9 Claims, 5 Drawing Sheets

REFLECTIVE TYPE TOUCH-SENSING DISPLAY PANEL AND MANUFACTURING METHOD THEREOF

CROSS-REFERENCE TO RELATED APPLICATION

This application claims the priority benefit of Taiwan application serial no. 99106297, filed on Mar. 4, 2010. The entirety of the above-mentioned patent application is hereby incorporated by reference herein and made a part of specification.

BACKGROUND OF THE INVENTION

1. Field of the Invention

The invention relates to a display panel and a manufacturing method thereof, and particularly to a reflective type touch-sensing display panel and a manufacturing method thereof.

2. Description of Related Art

Along with the development of flat panel displays (FPD), the characteristics of being light, thin and flexible are the foremost goal of display apparatuses in the future. The display technologies applied to the flexible display, the electronic paper, and the electronic book include the liquid crystal display technology, the electrophoretic display technology, the electrochromic display technology, and the like. The electrophoretic display includes an active device array substrate and an electrophoretic display film adhered on the active device array substrate. The electrophoretic display film has a display medium and a plurality of display particles distributed in the display medium. The display medium is, for example, a display solution, and the display particles are particles with positive polarity or negative polarity. The active device array substrate includes a plurality of pixel structures, each of which is constituted with an active device and a pixel electrode.

Generally, in order for the electrophoretic display to have a touch function, a capacitive or resistive touch panel can be adhered on the surface of the electrophoretic display. However, the additional adhesion of the touch panel onto the electrophoretic display not only leads to higher costs, but the adhering process also increases the complexity of the manufacturing process. Thus, the integration of photo-sensors to the active device array substrate of the electrophoretic display has been proposed. However, since conventional electronic paper display devices require environmental light, environmental light usually needs to pass through the electrophoretic display film to reach the photo-sensors on the active device array substrate. Consequently, the conventional method of integrating the photo-sensors to the active device array substrate of the electrophoretic display has low sensitivity in touch sensing.

SUMMARY OF THE INVENTION

The invention is directed to a reflective type touch-sensing display panel and a manufacturing method thereof for enhancing the sensitivity of touch sensing function of conventional electronic paper display devices.

The invention provides a reflective type touch-sensing display panel including a front substrate, a plurality of scan lines, a plurality of data lines, a plurality of pixel structures, a plurality of photo-sensors, a plurality of readout devices, a rear substrate, and a reflective display medium. The front substrate has an inner surface. The scan lines and the data lines are disposed on the inner surface of the front substrate and intersected with one another. The pixel structures are disposed on the inner surface of the front substrate. Each pixel structure is electrically connected to one of the scan lines and one of the data lines correspondingly. The photo-sensors are disposed on the inner surface of the front substrate. Each readout device is electrically connected to one of the photo-sensors correspondingly. The rear substrate is disposed opposite to the front substrate. The reflective display medium is sealed between the front substrate and the rear substrate. Particularly, each photo-sensor includes a transparent lower electrode disposed on the inner surface of the front substrate, a photo-sensitive silicon-rich dielectric layer disposed on the transparent lower electrode, and an upper electrode disposed on the photo-sensitive silicon-rich dielectric layer.

The invention further provides a manufacturing method of a reflective type touch-sensing display panel. A front substrate having an inner surface is provided. Moreover, the front substrate has a plurality of pixel regions and a plurality of photo-sensor regions. A plurality of scan lines and a plurality of data lines are formed on the inner surface of the front substrate, where the scan lines and the data lines are disposed correspondingly to the foregoing pixel regions. A switch device and a pixel electrode electrically connected to the switch device are formed in the corresponding pixel region. Here, each switch device is electrically connected to one of the scan lines and one of the data lines correspondingly. A photo-sensor and a readout device are formed in the photo-sensor region of one of the pixel regions correspondingly. Each readout device is electrically connected to the corresponding photo-sensor and each photo-sensor includes a transparent lower electrode disposed on the inner surface of the front substrate, an upper electrode disposed on the transparent lower electrode, and a photo-sensitive silicon-rich dielectric layer sandwiched between the transparent lower electrode and the upper electrode. A rear substrate is assembled with the front substrate and a reflective display medium is sealed between the front substrate and the rear substrate.

In light of the foregoing, since the photo-sensors are disposed on the inner surface of the front substrate in the invention, external light first passes through the photo-sensors on the front substrate and then enters the reflective display medium. Accordingly, the sensitivity of the photo-sensors can be enhanced. Moreover, the photo-sensors of the invention adopt the photo-sensitive silicon-rich dielectric layer as the photo conductive material thereof. Thus, the photo-sensors are conductive when illuminated and disconnected when not illuminated. Comparing to the conventional photo-sensors using sensing thin film transistors as photo-sensors, the photo-sensors of the invention have better photo-sensitivity.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
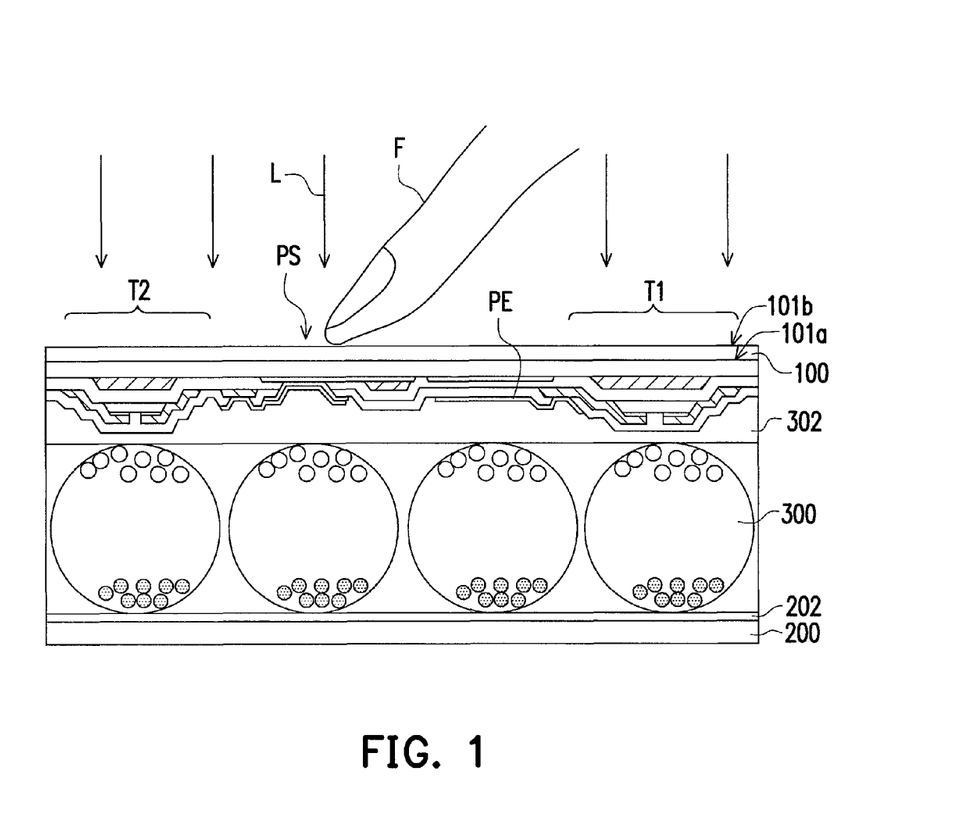
FIG. 1 is a schematic cross-sectional view of a reflective type touch-sensing display panel according to an embodiment of the invention.
Figure 2A:
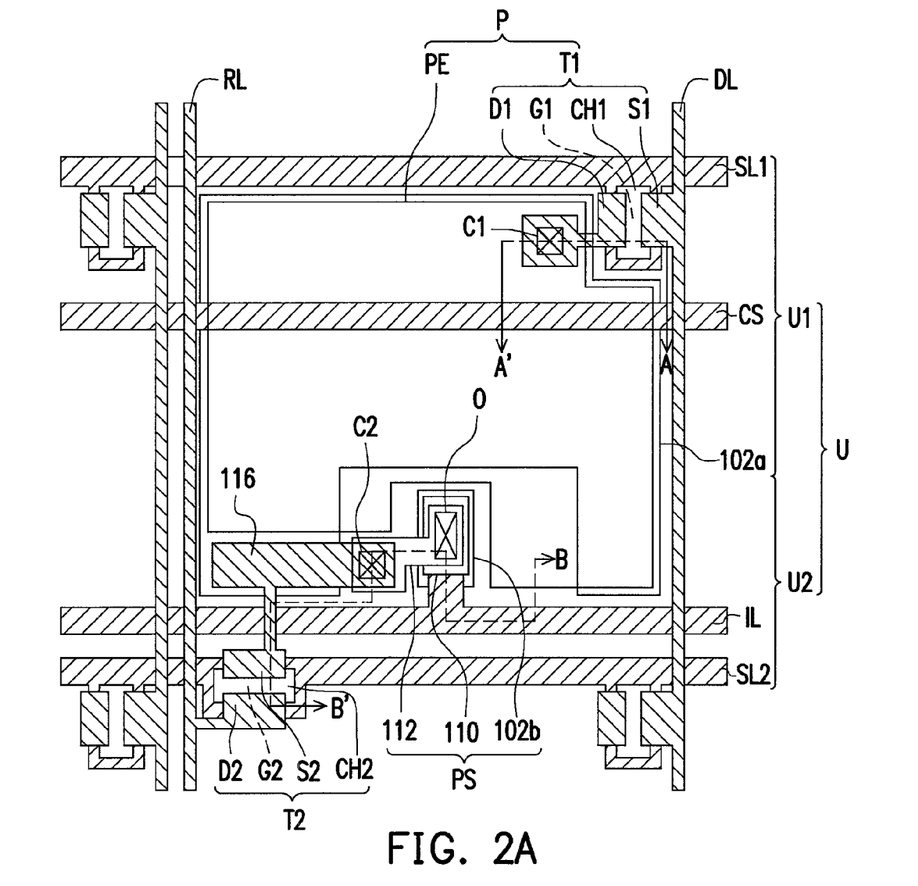
FIG. 2A is a schematic top view of a pixel unit having a photo-sensor region and a pixel region on a front substrate of the reflective type touch-sensing display panel in FIG. 1.
Figure 2B:
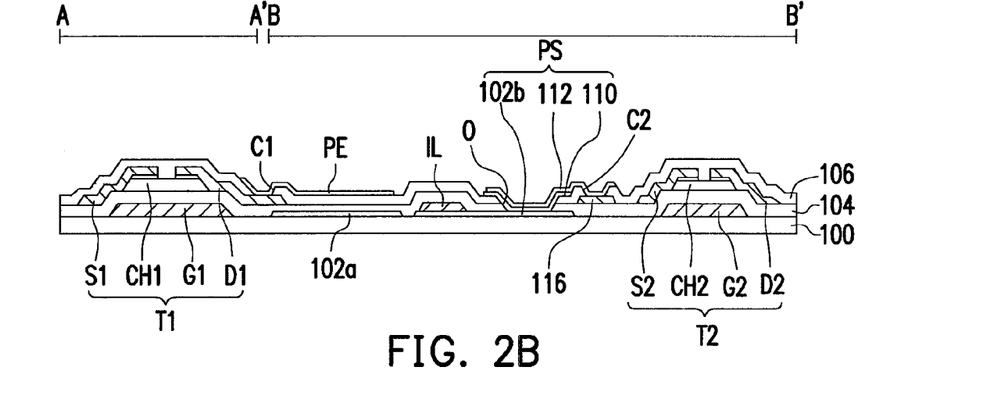
FIG. 2B is a cross-sectional schematic view taken along line A-A' and line B-B' in FIG. 2A.

FIG. 1 is a schematic cross-sectional view of a reflective type touch-sensing display panel according to an embodiment of the invention. FIG. 2A is a schematic top view of a pixel unit having a photo-sensor region and a pixel region on a front substrate of the reflective type touch-sensing display panel in FIG. 1. FIG. 2B is a cross-sectional schematic view taken along line A-A' and line B-B' in FIG. 2A. Referring to FIGS. 1, 2A, and 2B, a reflective type touch-sensing display panel of the present embodiment includes a front substrate 100, a plurality of scan lines SL1, SL2, a plurality of data lines DL, a plurality of pixel structures P, a plurality of photo-sensors PS, a plurality of readout devices T2, a rear substrate 200, and a reflective display medium 300.

The front substrate 100 has an inner surface 101a and an outer surface 101b. The front substrate 100 can be a transparent substrate. In order for an environmental light L to pass through the front substrate 100, the front substrate 100 adopts a transparent or light-transmissive material such as a transparent glass substrate or a transparent flexible substrate, for example. The front surface 101a of the front substrate 100 is mainly adopted for carrying devices. The outer surface 101b of the front substrate 100 is a passivation layer, an anti-mirror reflection layer, or a touch layer of other types, in which the effects aforementioned can also be attained by additionally adhering a film thereto. The front substrate 100 faces a user and the environmental light L, since the environmental light L enters the reflective type touch-sensing display panel from the outer surface 101b of the front substrate 100, the front substrate 100 can also be referred as an illuminated surface.

In the present embodiment, the inner surface 101a of the front substrate 100 has a plurality of pixel units U arranged in an array. Only one pixel unit U is depicted in FIGS. 1, 2A, and 2B, so that persons skilled in the art can understand the invention clearly. It should be noted that the pixel unit U illustrated in FIGS. 2A and 2B includes a pixel region U1 and a photo-sensor region U2. However, the invention does not limit each pixel unit U to include the pixel region U1 and the photo-sensor region U2. According to one embodiment, one photo-sensor region U2 is disposed every N pixel units U, and the other pixel units U are merely disposed with the pixel regions U1.

Referring to FIGS. 2A and 2B, the scan lines SL1, SL2 and the data line DL are disposed on the inner surface 101a of the front substrate 100. The scan lines SL1, SL2, and the data line DL intersected with the scan lines SL1 and SL2. In other words, an extending direction of the data line DL is not parallel to extending directions of the scan lines SL1, SL2. Moreover, it is favorable for the extending direction of the data line DL to be perpendicular to the extending directions of the scan lines SL1, SL2. In addition, the scan lines SL1, SL2 and the data line DL are in different layers. The scan lines SL1, SL2, and the data line DL are usually fabricated using metal material for conductivity. However, the invention is not limited thereto. According to other embodiments, the scan lines SL1, SL2, and the data line DL can also adopt other conductive materials.

The pixel structures P are disposed on the inner surface 101a of the front substrate 100. Each pixel structure P is electrically connected to the scan line SL1 and the data line DL correspondingly. In details, the pixel structure P is disposed in the pixel region U1 of every pixel unit U on the inner surface 101a of the front substrate 100. According to the present embodiment, the pixel structure P includes a switch device T1 and a pixel electrode PE. The switch device T1 is electrically connected to the scan line SL1 and the data line DL. On the other hand, the pixel electrode PE is electrically connected to the switch device T1. Specifically, the switch device T1 includes a gate electrode G1, a channel CH1, a source electrode S1, and a drain electrode D1. The gate electrode G1 is electrically connected to the scan line SL1. The channel CH1 is disposed above the gate electrode G1. The source electrode S1 and the drain electrode D1 are disposed above the channel CH1, and the source electrode S1 is electrically connected to the data line DL. The pixel electrode PE is electrically connected to the drain electrode D1 of the switch device T1 through a contact hole C1. A bottom gate electrode thin-film transistor (TFT) is used as the switch device T1 for illustration; however, the invention is not limited thereto. According to other embodiments, the switch device T1 can also be a top gate electrode TFT.

According to an embodiment of the invention, the pixel region U1 further includes a transparent storage capacitance electrode layer 102a disposed therein. The transparent storage capacitance electrode layer 102a is disposed on the inner surface 101a of the front substrate 100 and sandwiched between the pixel electrode PE and the inner surface 101a of the front substrate 100. The transparent storage capacitance electrode layer 102 nearly occupies the entire area of the pixel region U1. The transparent storage capacitance electrode layer 102a, the pixel electrode PE and an insulation layer disposed between the transparent storage capacitance electrode layer 102a and the pixel electrode PE constitute a storage capacitor (i.e. the insulation layers 104, 106 illustrated in FIG. 2B). Additionally, according to the present embodiment, a storage capacitance electrode line CS is further disposed on a surface of the transparent storage capacitance electrode layer 102a. The storage capacitance electrode line CS electrically contacts the transparent storage capacitance electrode layer 102a directly. An extending direction of the storage capacitance electrode line CS is parallel to the extending directions of the scan lines SL1, SL2. Moreover, the storage capacitance electrode line CS and the scan lines SL1, SL2 are in the same layer. Since the storage capacitance electrode line CS is electrically connected to a common voltage Vcom, the transparent storage capacitance electrode layer 102a in each pixel region U1 on the front substrate 100 obtains the common voltage Vcom through the storage capacitance electrode line CS.

In addition, the photo-sensor PS is disposed in the photo-sensor region U2 of the front substrate 100. Particularly, each photo-sensor PS includes a transparent lower electrode 102b disposed on the inner surface 101a of the front substrate 100, a photo-sensitive silicon-rich dielectric layer 110 disposed on the transparent lower electrode 102b, and an upper electrode 112 disposed on the photo-sensitive silicon-rich dielectric layer 110. According to an embodiment of the invention, the transparent storage capacitance electrode layer 102a and the transparent lower electrode 102b of the photo-sensor PS are in the same layer (as shown in FIG. 2B). Therefore, the transparent storage capacitance electrode layer 102a and the transparent lower electrode 102b of the photo-sensor PS can be manufactured using the same material. Furthermore, the photo-sensitive silicon-rich dielectric layer 110 of the photo-sensor PS includes a silicon-rich silicon oxide layer (SiOx), a silicon-rich silicon nitride layer (SiNy), a silicon-rich silicon oxynitride layer (SiOxNy), a silicon-rich silicon carbide layer (SiCz), a silicon-rich oxycarbide layer (SiOxCz), a hydrogenized silicon-rich silicon oxide layer (SiHwOx), a hydrogenized silicon-rich silicon nitride layer (SiHwNy), a hydrogenized silicon-rich silicon carbide layer (SiHwCz), or a combination thereof. Herein, $0<w<4$, $0<x<2$, $0<y<1.34$, and $0<z<1$. Moreover, the upper electrode 112 of the photo-sensor PS is a transparent electrode, and the upper electrode 112 and the pixel electrode PE are in the same layer (as depicted in FIG. 2B). Therefore, the upper electrode 112 of the photo-sensor PS and the pixel electrode PE are manufactured using the same material.

In addition, the readout device T2 is further disposed in the photo-sensor region U2 of the front substrate 100. This readout device T2 is electrically connected to the photo-sensor PS. According to the present embodiment, the readout device T2 includes a gate electrode G2, a channel CH2, a source electrode S2, and a drain electrode D2. The gate electrode G2 is electrically connected to the scan line SL2. The channel CH2 is disposed above the gate electrode G2. The source electrode S2 and the drain electrode D2 are disposed above the channel CH2. The source electrode S2 is connected to an extending portion 116. Thus, the source electrode S2 of the readout device T2 is electrically connected to a contact hole C2 and, therefore, to the upper electrode 112 of the photo-sensor PS through the extending portion 116. A bottom gate electrode TFT is used as the readout device T2 for illustration; however, the invention is not limited thereto. According to other embodiments, the readout device T2 can also be a top gate electrode TFT.

According to the present embodiment, a plurality of sensing signal readout lines RL is further disposed on the inner surface 101a of the front substrate 100. Each sensing signal readout line RL is electrically connected the corresponding readout device T2. In details, the sensing signal readout line RL is electrically connected to the drain electrode D2 of the readout device T2. Further, a plurality of sensing signal-input lines IL is further disposed on the inner surface 101a of the front substrate 100. Each sensing signal-input line IL is electrically connected the transparent lower electrode 102b of the corresponding photo-sensor PS. In the embodiment illustrated in FIG. 2B, the sensing signal-input line IL is disposed on a surface of the transparent lower electrode 102b of the photo-sensor PS directly, such that the two can electrically contact directly.

Referring to FIG. 1, the rear substrate 200 is disposed opposite to the front substrate 100. According to an embodiment of the invention, an electrode layer 202 is further disposed on a surface of the rear substrate 200. Since the touch display panel of the invention is a reflective touch display panel, the rear substrate 200 is a non-transparent substrate or a transparent substrate. For example, the rear substrate 200 is a metal substrate, glass substrate, or flexible substrate. A reflective layer not shown may be disposed on the rear substrate 200.

The reflective display medium 300 is sealed between the front substrate 100 and the rear substrate 200. The reflective display medium 300 means that when the environmental light L enters from the front substrate 100 and reaches the reflective display medium 300, the reflective display medium 300 reflects the environmental light L, so that the environmental light L leaves again from the front substrate 100. The reflective display medium 300 is, for instance, a capsule electrophoretic display medium (as shown in FIG. 1), a microcell electrophoretic display medium, a cholesterol liquid crystal electrophoretic display medium, or other types of reflective electrophoretic display medium. The front substrate 100, the display medium 300, and the rear substrate 200 can be adhered through an adhesive layer 302. In addition, a passivation layer material can be filled between the front substrate 100, the display medium 300, and the rear substrate 200 for protecting devices or layers on the front substrate 100 and the rear substrate 300.

In the foregoing reflective display panel, the photo-sensor PS adopts the photo-sensitive silicon-rich dielectric layer 110 as the photo-conductive material thereof. The photo-sensor PS is conductive under illumination. When a touch operation device, for example, a user's finger F performs a touch operation and blocks the environmental light L from entering the photo-sensor PS (without illumination), the photo-sensor PS is disconnected. The touched position can be sensed by detecting the sensing signal changes using this method.

Accordingly, since the photo-sensor PS is disposed on the inner surface 101a of the front substrate 100 in the foregoing embodiment, the environmental light L first passes through the photo-sensor PS on the front substrate 100 and then enters the reflective display medium 300. The sensitivity of the photo-sensor PS can be enhanced as a consequence.

Figure 3A:
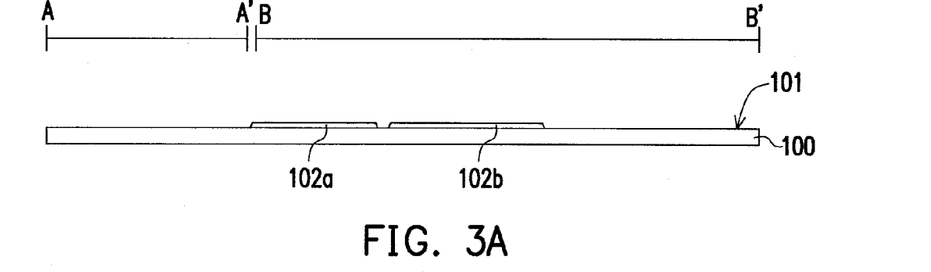
FIGS. 3A through 3G are flowcharts schematically depicting the manufacture of devices on the front substrate of the reflective display panel according to an embodiment of the invention.

FIGS. 3A through 3G are flowcharts schematically depicting the manufacture of devices on the front substrate of the reflective display panel according to an embodiment of the invention. Here, the flowcharts show the manufacture of the devices on the front substrate as illustrated in FIGS. 2A and 2B. Referring to FIGS. 2A, 2B, and 3A, the inner surface 101a of the front substrate 100 has a plurality of pixel units U and each pixel unit U includes the pixel region U1 and the photo-sensor region U2 (as shown in FIG. 2A). Here, FIG. 3A merely illustrates a cross-section of the pixel region U1 corresponding to line A-A' and a cross-section of the photo-sensing region U2 corresponding to line B-B'. Similarly, the invention does not limit each pixel unit U to include the pixel region U1 and the photo-sensor region U2. According to one embodiment, one photo-sensor region U2 is disposed every N pixel units U, and the other pixel units U are merely disposed with the pixel regions U1. The transparent lower electrode 102b is formed on the front substrate 100. According to the present embodiment, the transparent storage capacitance electrode layer 102a is formed in every pixel region U1 when forming the transparent lower electrode 102b.

Figure 3B:
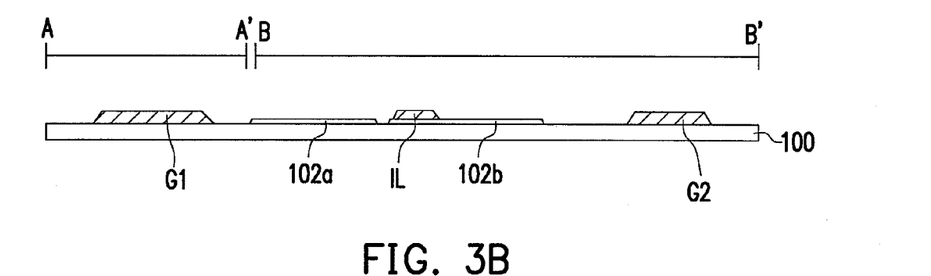

Referring to FIGS. 2A, 2B, and 3B, the scan lines SL1, SL2 are formed on the inner surface 101a of the front substrate 100. At this time, the gate electrode G1 which is electrically connected to the scan line SL1 is formed in the pixel region U1 and the gate electrode G2 which is electrically connected to the scan line SL2 is formed in the photo-sensor region U2. According to the present embodiment, a storage capacitance electrode line CS is further formed on the transparent storage capacitance electrode layer 102a when forming the scan lines SL1, SL2 and the gate electrodes G1, G2. The storage capacitance electrode line CS electrically contacts the transparent storage capacitance electrode layer 102a. In addition, a sensing signal-input line IL is further formed when forming the scan lines SL1, SL2 and the gate electrodes G1, G2. The sensing signal-input line IL is directly formed on the surface of the transparent lower electrode 102b.

Figure 3C:
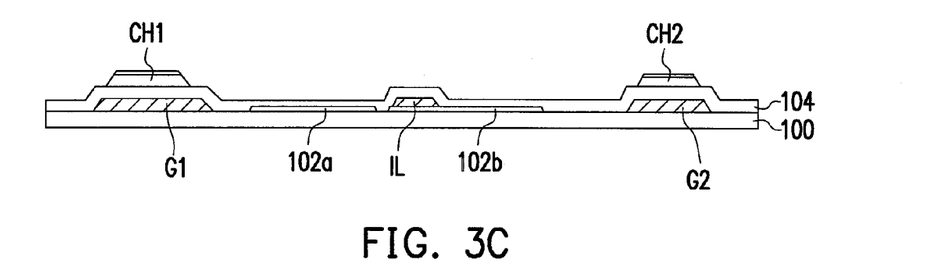

Referring to FIG. 3C, a first insulation layer 104 is formed on the front substrate 100. The first insulation layer 104 covers the structures aforementioned (including the scan lines SL1, SL2, the gate electrodes G1, G2, the sensing signal-input line IL, the transparent storage capacitance electrode layer 102a, and the transparent lower electrode 102b). Next, the channel CH1 is formed on the first insulation layer 104 above the gate electrode G1 and the channel CH2 is formed on the first insulation layer 104 above the gate electrode G2. The channels CH1, CH2 are manufactured using doped amorphous silicon, and surfaces of the channel CH1, CH2 favorably include ohmic contact layers.

Figure 3D:
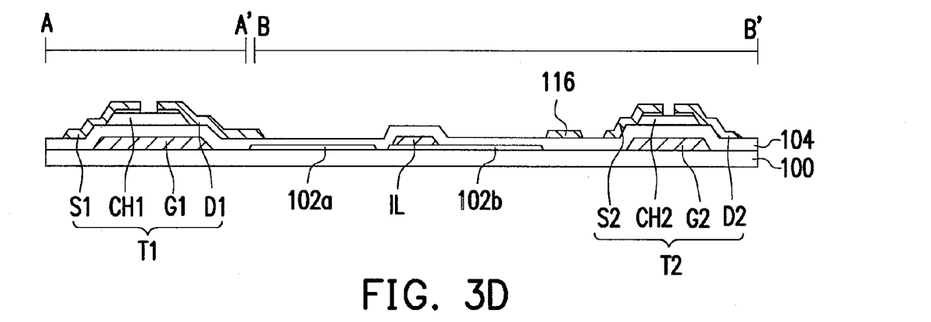

Referring to FIG. 3D, the data line DL is formed on the inner surface 101a of the front substrate 100. At this time, the source electrode S1 and the drain electrode D1 are formed on the channel CH1 in the pixel region U1. The source electrode S1 is electrically connected to the data line DL. Moreover, the source electrode S2 and the drain electrode D2 are formed on the channel CH2. Here, the gate electrode G1, the channel CH1, the source electrode S1, and the drain electrode D1 constitute the switch device T1. Also, the gate electrode G2, the channel CH2, the source electrode S2, and the drain electrode D2 constitute the readout device T2. According to the present embodiment, the extending portion 116 and the sensing signal readout line RL are formed, the extending portion 116 is electrically connected to the source electrode S2, and the sensing signal read line RL is electrically connected to the drain electrode D2 when forming the source electrode S1, the drain electrode D1, the source electrode S2, and the drain electrode D2.

Figure 3E:
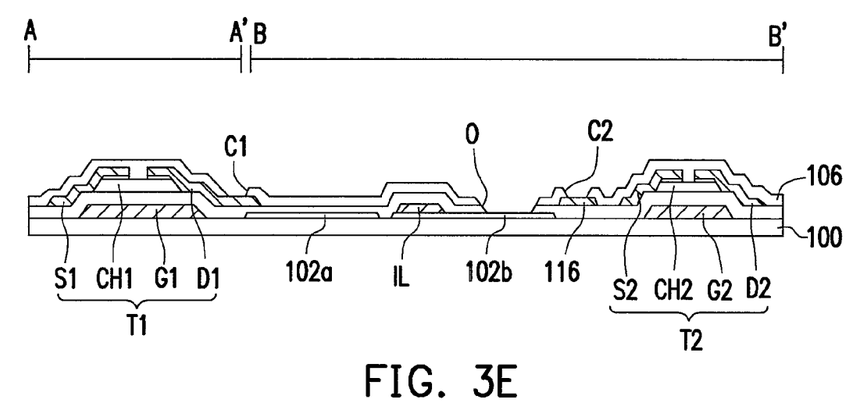

Referring to FIG. 3E, the second insulation layer 106 is formed and covers the structures aforementioned (including the data line DL, the switch device T1, the read device T2, the extending portion 116, and the sensing signal read line RL). Next, the contact hole C1 is formed in the second insulation layer 106 to expose the drain electrode D1 of the switch device T1, and a device opening O is formed in the second insulation layer 106 and the first insulation layer 104 of the photo-sensor region U2 to expose the transparent lower electrode 102b. The second insulation layer 106 further includes the contact hole C2 which exposes the extending portion 116.

Figure 3F:
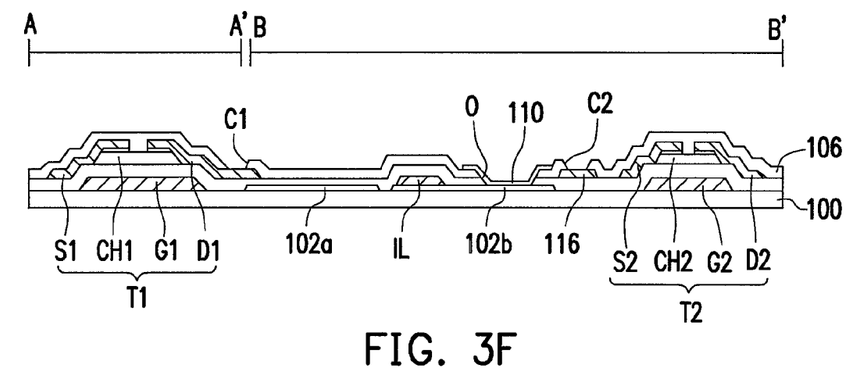

Referring to FIG. 3F, the photo-sensitive silicon-rich dielectric layer 110 is formed in the photo-sensor region U2 and filled into the device opening O in the second insulation layer 106 and the first insulation layer 104. The photo-sensitive silicon-rich dielectric layer 110 adopts a silicon-rich silicon oxide layer as an example, utilizes a chemical vapor deposition process to flow silicon-containing gas and oxygen-containing gas into a reaction chamber, and adjust the gas ratio suitably, so that the silicon content is higher than the oxide content in the silicon-rich silicon oxide layer formed. Since this is well-know to persons skilled in the art, further descriptions are not repeated hereinafter.

Figure 3G:
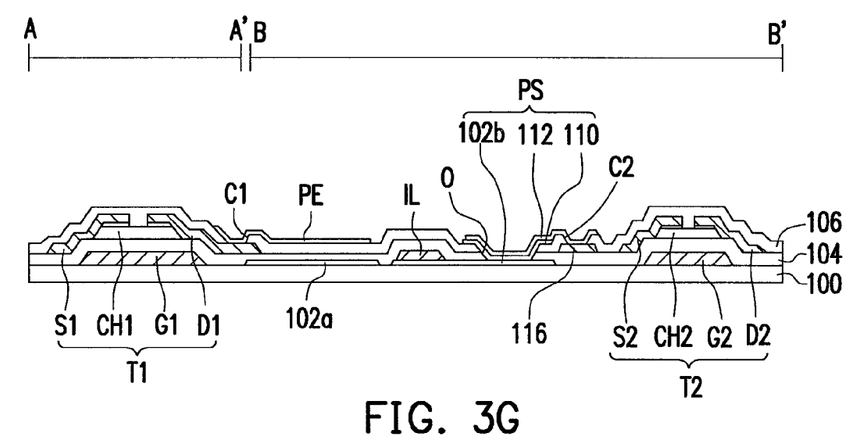

Referring to FIG. 3G, the pixel electrode PE is formed in the pixel region U1. Here, the pixel electrode PE is further filled into the contact hole C1 so as to be electrically connected to the drain electrode D1 of the switch device T1. The upper electrode 112 is formed on the photo-sensitive silicon-rich dielectric layer 110 in the photo-sensor region U2 at the same time. The upper electrode 112 is further filled into the contact hole C2 so as to be electrically connected to the extending portion 116. Since the extending portion 116 is electrically connected to the source electrode S2 of the readout device T2, the upper electrode 112 can electrically connect with the source electrode S2 of the readout device T2 through the extending portion 116 and the contact hole C2.

The manufacture of the devices on the front substrate 100 is finished after the step shown in FIG. 3G. Thereafter, the front substrate 100 is assembled with the rear substrate 200 and the reflective display medium 300 is sealed therebetween to form a reflective type touch-sensing display panel.

Figure 4A:
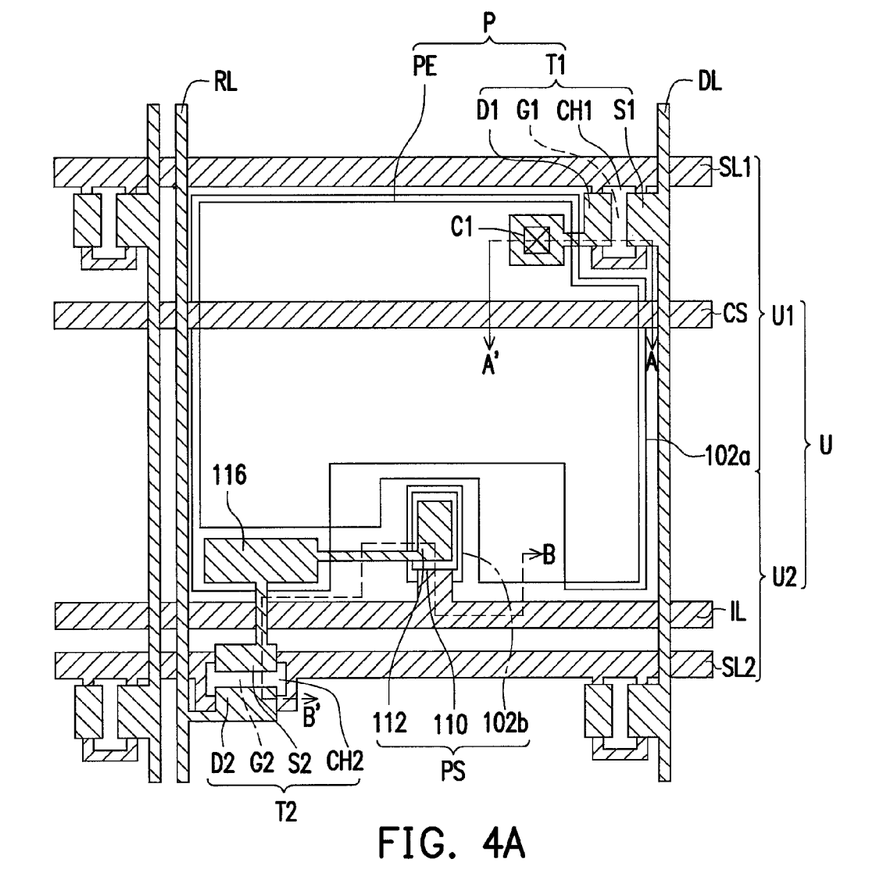
FIG. 4A is a schematic top view of a pixel unit having a photo-sensor region and a pixel region on a front substrate of a reflective type touch-sensing display panel according to another embodiment of the invention.
Figure 4B:
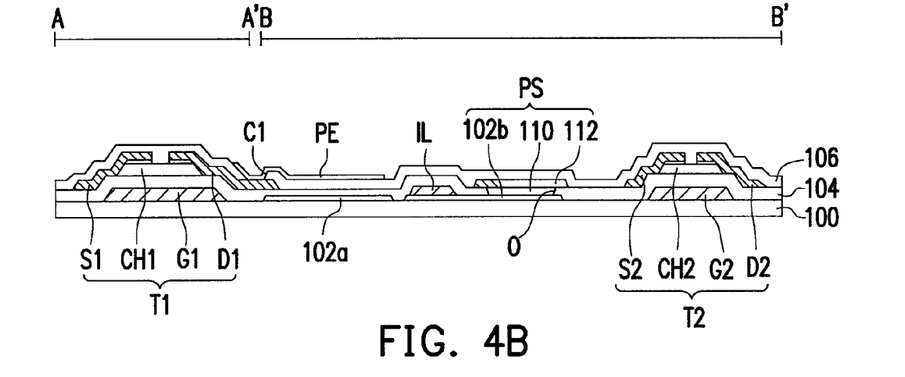
FIG. 4B is a cross-sectional schematic view taken along line A-A' and line B-B' in FIG. 4A.

FIG. 4A is a schematic top view of a pixel unit having a photo-sensor region and a pixel region on a front substrate of a reflective type touch-sensing display panel according to another embodiment of the invention. FIG. 4B is a cross-sectional schematic view taken along line A-A' and line B-B' in FIG. 4A. The pixel units shown in FIG. 4A and FIG. 4B are similar to those shown in FIG. 2A and FIG. 2B so that components identical to those of FIG. 2A and FIG. 2B are denoted with the same numerals in FIG. 4A and FIG. 4B and not repeated herein.

Referring to FIGS. 4A and 4B, the pixels units in FIG. 4A and FIG. 4B are different from those in FIGS. 2A and 2B in that the photo-sensor PS includes the transparent lower electrode 102b, the photo-sensitive silicon-rich dielectric layer 110, and the upper electrode 112. Here, the upper electrode 112 is a metal electrode. According to the present embodiment, the upper electrode 112 of the photo-sensor PS is electrically connected to the extending portion 116 directly. The extending portion 116 is electrically connected to the source electrode S2 of the readout device T2.

The manufacturing flowcharts of the pixel units in FIGS. 4A and 4B and the manufacturing flowcharts of the pixel units in FIGS. 2A and 2B are similar to those illustrated in FIGS. 3A through 3G. However, the pixel units are different in that in the step shown in FIG. 3D, the upper electrode 112 is formed simultaneously when forming the source electrode S1, the drain electrode D1, the source electrode S2, the drain electrode D2 and the extending portion 116, and the extending portion is connected to the upper electrode 112 directly. In the present embodiment, since the upper electrode 112 is formed simultaneously when forming the extending portion 116, the upper electrode 112 of the photo-sensor PS does not need to be formed in the subsequent formation of the pixel electrode PE.

In summary, since the photo-sensors are disposed on the inner surface of the front substrate in the invention, the environmental light first passes through the photo-sensors on the front substrate and then enters the reflective display medium. Accordingly, the sensitivity of the photo-sensors can be enhanced.

Furthermore, the photo-sensors of the invention adopt the photo-sensitive silicon-rich dielectric layer as the photo conductive material thereof. Thus, the photo-sensors are conductive when illuminated and disconnected when not illuminated. The invention applies the photo-sensitive silicon-rich dielectric layer as the photo-sensors. Comparing to the conventional photo-sensors using sensing TFTs as photo-sensors, the photo-sensors of the invention have better photo-sensitivity.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A reflective type touch-sensing display panel, comprising:
   a front substrate having an inner surface and an outer surface opposite to the inner surface;
   a plurality of scan lines disposed on the inner surface of the front substrate;
   a plurality of data lines disposed on the inner surface of the front substrate and intersected with the scan lines;

a plurality of pixel structures, disposed on the inner surface of the front substrate, each of the pixel structures being electrically connected to one of the scan lines and one of the data lines correspondingly, and each of the pixel structures comprising:
- a switch device electrically connected to one of the scan lines and one of the data lines correspondingly;
- a pixel electrode electrically connected to the switch device; and
- a transparent storage capacitance electrode layer disposed on the inner surface of the front substrate and sandwiched between the pixel electrode and the front substrate;

a plurality of photo-sensors disposed on the inner surface of the front substrate, each of the photo-sensors comprising:
- a transparent lower electrode disposed on the inner surface of the front substrate;
- a photo-sensitive silicon-rich dielectric layer disposed on the transparent lower electrode; and
- an upper electrode disposed on the photo-sensitive silicon-rich dielectric layer;

a plurality of readout devices, each of the readout devices being electrically connected to one of the photo-sensors correspondingly;

a rear substrate disposed opposite to the front substrate; and a reflective display medium sealed between the front substrate and the rear substrate, wherein the photo-sensors are disposed between the front substrate and the reflective display medium; and wherein the transparent storage capacitance electrode layer of the pixel structure and the transparent lower electrode of the photo-sensor are made of a same layer.

2. The reflective type touch-sensing display panel as claimed in claim 1, wherein the upper electrode of the photo-sensor is a metal electrode.

3. The reflective type touch-sensing display panel as claimed in claim 2, wherein the upper electrode of the photo-sensor is electrically connected to the readout device directly.

4. The reflective type touch-sensing display panel as claimed in claim 1, wherein the upper electrode of the photo-sensor is a transparent electrode.

5. The reflective type touch-sensing display panel as claimed in claim 4, wherein the upper electrode of the photo-sensor is electrically connected to the readout device through a contact hole.

6. The reflective type touch-sensing display panel as claimed in claim 1, wherein the photo-sensitive silicon-rich dielectric layer of the photo-sensor comprises a silicon-rich silicon oxide layer, a silicon-rich silicon nitride layer, a silicon-rich silicon oxynitride layer, a silicon-rich silicon carbide layer, a silicon-rich oxycarbide layer, a hydrogenized silicon-rich silicon oxide layer, a hydrogenized silicon-rich silicon nitride layer, a hydrogenized silicon-rich silicon carbide layer, or a combination thereof.

7. The reflective type touch-sensing display panel as claimed in claim 1, further comprising a plurality of sensing signal readout lines, each of the sensing signal readout lines being electrically connected to one of the readout devices correspondingly.

8. The reflective type touch-sensing display panel as claimed in claim 1, further comprising a plurality of sensing signal-input lines, each of the sensing signal-input lines being electrically connected to the transparent lower electrode of one of the photo-sensors correspondingly.

9. The reflective type touch-sensing display panel as claimed in claim 1, wherein the reflective display medium comprises a capsule electrophoretic display medium, a microcell electrophoretic display medium, and a cholesterol liquid crystal electrophoretic display medium.

* * * * *